No. 703,488. Patented July 1, 1902.
D. W. SMEDLEY.
VEHICLE AXLE LUBRICATOR.
(Application filed Mar. 13, 1902.)
(No Model.)
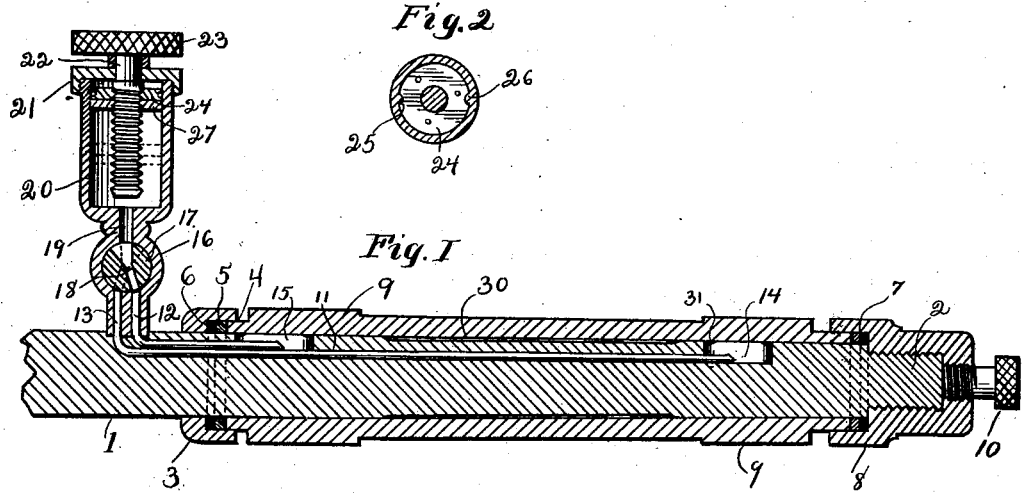
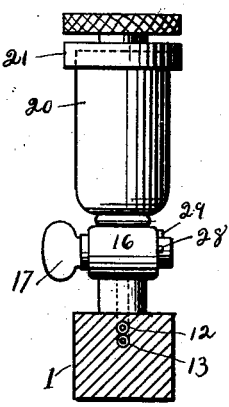
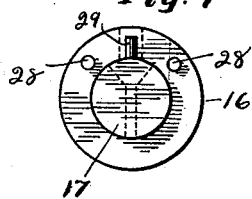
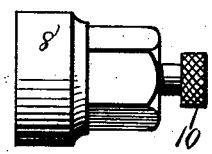
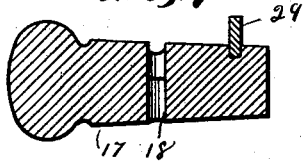
Witnesses
W H Stough
J. R. Bond
Inventor
Daniel W. Smedley
By F. W. Bond
Att'y.

UNITED STATES PATENT OFFICE.

DANIEL W. SMEDLEY, OF WILMOT, OHIO, ASSIGNOR OF ONE-HALF TO ALBERT F. KANAGE, OF WILMOT, OHIO.

VEHICLE-AXLE LUBRICATOR.

SPECIFICATION forming part of Letters Patent No. 703,488, dated July 1, 1902.

Application filed March 13, 1902. Serial No. 98,001. (No model.)

*To all whom it may concern:*

Be it known that I, DANIEL W. SMEDLEY, a citizen of the United States, residing at Wilmot, in the county of Stark and State of Ohio, have invented certain new and useful Improvements in Vehicle-Axle Lubricators; and I do hereby declare that the following is a full, clear, and exact description of the same, reference being had to the annexed drawings, making a part of this specification, and to the figures of reference marked thereon, in which—

Figure 1 is a sectional view of the axle, showing the lubricating-cup and its plunger properly connected, also showing the wheel-retaining nut properly located. Fig. 2 is a sectional view of the oil-cup, showing the piston properly located. Fig. 3 is a transverse section of the axle, showing the cup and its valve properly arranged. Fig. 4 is an enlarged view showing the end of the valve-chamber and the stops. Fig. 5 is a detached view of the axle-nut. Fig. 6 is a view showing a portion of the axle and illustrating a portion of the hub-boxing located thereon and illustrating one of the lubricating-slots. Fig. 7 is a longitudinal section of the cut-off valve.

The present invention has relation to vehicle-axle lubricators; and it consists in the different parts and combination of parts hereinafter described, and particularly pointed out in the claim.

Similar numerals of reference indicate corresponding parts in all the figures of the drawings.

In the accompanying drawings, 1 represents a portion of the axle, which is formed in the usual manner, reference being had to attaching my improved devices thereto. The end of the axle is provided with the usual screw-threaded portion 2 and is also provided with the fixed collar 3, which fixed collar is provided with the annular groove 4, said groove being for the purpose of receiving and holding a washer 5, which washer is formed of any suitable material, and the side thereof toward the collar is provided with a felt disk 6, this arrangement being for the purpose of preventing a waste of oil.

For the purpose of preventing the oil from escaping from the outer end of the axle the washer 7 is provided, and for the purpose of adjusting the nut 8, so as to properly hold the boxing 9 of the hub, the adjusting-screw 10 is provided, this arrangement being important in this class of lubricators, as I am enabled to so regulate the adjustment of the nut 8 upon the washer 7 that it will be held in such a position that the oil cannot easily escape.

The axle 1 is provided with a groove, which groove is formed of such a depth that the oil-conveying pipes 12 and 13 can be placed therein, one above the other, the lower one extending to and communicating with the open slot 14 and the upper one communicating with the slot 15, and for the purpose of retaining the pipes in proper position and at the same time closing the groove said groove should be filled with suitable metal after the pipes 12 and 13 have been placed in proper relative position.

The pipes 12 and 13 are extended upward, as illustrated in Fig. 1, and communicate with the valve-chamber 16, which valve-chamber contains the valve 17, which valve is provided with the oil-passage 18, the top or upper end of which passage is funnel shape, so that when the valve 17 is turned to bring the passage 18 in alinement with the proper pipe 12 or 13 the communication will not be cut off from the oil-pipe 19; but when it is desired to cut off the supply of oil the valve 17 is turned so as to bring the passage 18 directly between the top or upper ends of the pipes 12 and 13, thereby cutting off the supply of oil and prevent the waste of oil.

Above the valve-chamber is located the oil-cup 20 and is formed of sufficient size to hold a supply of oil for a considerable length of time.

The top or upper end of the oil-cup 20 is provided with the screw-threaded cap 21, which screw-threaded cap is provided with an aperture to receive the stem 22, to the top or upper end of which is attached the knob 23. The stem 22 is screw-threaded below the cap 21, and on said screw-threaded portion is located the piston 24.

It will be understood that by turning the knob 23 in one direction the rotation of the stem 22 will move the piston downward and force the oil through the passage 18 and into the proper pipe 12 or 13, reference being had to the position of the valve 17. It will be understood that by this arrangement I am enabled to force the oil through the pipes 12 and 13 and outward onto the axle through the slots 14 and 15, and by providing the screw-threaded stem 22 and placing the piston 24 thereon I am enabled to force heavy oils through the passages 19 18 and the pipes 13 and 12.

For the purpose of preventing the piston 24 from rotating during the time the stem 22 is rotated the inner periphery of the cup 20 is provided with the ribs 25, which ribs are located in the notches 26, formed in the piston 24.

For the purpose of preventing the oil from passing the piston 24 a washer 27, formed of flexible material, is connected to the bottom or under side of the piston 24. This is done by suitable screws or in any other convenient and well-known manner.

For the purpose of stopping the valve 17 at the proper point to bring the passage 18 into proper alinement stop-pins 28 are provided, which stop-pins are located on the housing of the valve-chamber, as illustrated in Fig. 4, and the valve 17 provided with the pin 29.

For the purpose of throwing the bearing of the vehicle-hub proper at the inner and outer ends thereof the axle 1 is cut out, or, in other words, formed of less diameter, so as to produce the open space 30 between the hub-boxing 9 and the axle 1.

For the purpose of leading the oil from the slots 14 and 15 the grooves 31 are provided, which grooves are formed upon portions of the periphery of the axle 1, preferably at the ends of the slots, as illustrated.

Having fully described my invention, what I claim as new, and desire to secure by Letters Patent, is—

In a vehicle-axle lubricator, an axle provided with a groove having located therein oil-conveying pipes, said pipes being covered with metal, and leading to and communicating with open slots, and the axle provided with a reduced portion between the bearing-points of the hub-boxing, and an oil-cup provided with a passage leading to the oil-conveying tubes, and means for forcing the oil through the conveying-tubes from the cup, substantially as and for the purpose specified.

In testimony that I claim the above I have hereunto subscribed my name in the presence of two witnesses.

DANIEL W. SMEDLEY.

Witnesses:
  W. S. PUTMAN,
  JAMES CRISE.